US012146355B2

(12) United States Patent
Martinez Lodeiros et al.

(10) Patent No.: US 12,146,355 B2
(45) Date of Patent: Nov. 19, 2024

(54) BEARING SYSTEM FOR A SLIDE

(71) Applicant: EXLABESA BUILDING SYSTEMS S.A.U., Valga-Pontevedra (ES)

(72) Inventors: Jose Antonio Martinez Lodeiros, South Yorkshire (GB); Maria Jesus Devesa Castineiras, South Yorkshire (GB); Javier Fernandez Cobian, South Yorkshire (GB)

(73) Assignee: EXLABESA BUILDING SYSTEMS S.A.U., Valga-Pontevedra (ES)

(*) Notice: Subject to any disclaimer, the term of this patent is extended or adjusted under 35 U.S.C. 154(b) by 0 days.

(21) Appl. No.: 18/001,205

(22) PCT Filed: May 18, 2022

(86) PCT No.: PCT/EP2022/063373

§ 371 (c)(1),
(2) Date: Dec. 8, 2022

(87) PCT Pub. No.: WO2022/268412

PCT Pub. Date: Dec. 29, 2022

(65) Prior Publication Data

US 2024/0301736 A1 Sep. 12, 2024

(30) Foreign Application Priority Data

Sep. 2, 2021 (ES) ................................ ES202130827

(51) Int. Cl.
*E05D 15/06* (2006.01)
*E06B 3/46* (2006.01)

(52) U.S. Cl.
CPC ........ *E05D 15/0665* (2013.01); *E06B 3/4636* (2013.01); *E05Y 2900/132* (2013.01)

(58) Field of Classification Search
CPC .......................... E05D 15/0665; E06B 3/4636
See application file for complete search history.

(56) References Cited

U.S. PATENT DOCUMENTS 8,806,808 B2 * 8/2014 Joray .................. E05D 15/0665 49/425
11,136,802 B2 * 10/2021 Tsimbikos .......... E05D 15/0686
(Continued)

FOREIGN PATENT DOCUMENTS

| | | |
|---|---|---|
| EP | 2525033 A1 | 11/2012 |
| EP | 2361339 B1 | 6/2013 |
| EP | 3219895 A1 | 9/2017 |

OTHER PUBLICATIONS

International Search Report and Written Opinion for Corresponding International Application No. PCT/EP2022/063373 (11 Pages) (Oct. 19, 2022).

*Primary Examiner* — Rodney Mintz
(74) *Attorney, Agent, or Firm* — LUCAS & MERCANTI, LLP

(57) ABSTRACT

Bearing system for a slide comprising a U-shaped profile (1) such that between the two wings (2) of the U-shaped profile (1) the system has an inner support profile (4) forming a central housing (5) and two lateral housings (6) at the sides of the central housing (5) with two recesses (7) between two of the walls perpendicular to the web (3) and the wings (2) of the U-shaped profile (1) and a sliding profile (8) having two housings (9) facing the lateral housings (6); wherein the central housing (5) has an element to choose between a central cover (10) covering it and a rail (12) located in a longitudinal slot (13) of the central housing (5), with a bearing system between the sliding profile (8) and the inner support profile (4).

4 Claims, 4 Drawing Sheets

(56) References Cited

U.S. PATENT DOCUMENTS

| | | | | |
|---|---|---|---|---|
| 11,713,607 | B2 * | 8/2023 | Fontijn | E05D 15/0656 49/425 |
| 2011/0197515 | A1 * | 8/2011 | Joray | E05D 15/0686 49/425 |
| 2019/0226257 | A1 | 7/2019 | Fontijn et al. | |
| 2019/0383078 | A1 * | 12/2019 | Tsimbikos | E06B 3/46 |
| 2020/0080362 | A1 * | 3/2020 | Siller | E06B 1/70 |

* cited by examiner

BEARING SYSTEM FOR A SLIDE

CROSS-REFERENCE TO RELATED APPLICATIONS

This application is a 371 of PCT/EP2022/063373, filed May 18, 2022, which claims the benefit of Spanish Patent Application No. P202130827, filed Sep. 2, 2021, each of which are incorporated herein by reference.

FIELD OF THE INVENTION

The present invention relates to a bearing system for a slide that extends the capabilities of the systems known in the state of the art and provides versatility by allowing two ways of mounting with the same profile in which different elements are fitted depending on whether it is desired to mount with the bearings in the pane or with the bearings in the frame.

BACKGROUND OF THE INVENTION

In the state of the art there are generally two different solutions for large slides, each with its advantages and disadvantages.

A first solution in which the bearings are located in the lower frame, that is, they carry lower profiles with a large number of small bearings through which the panes slide, such a that large pane weights can be reached and, as these systems are usually recessed on the floor, there is little recess between the floor and the bearing profile, and it does not represent a problem for the passage. This solution has certain disadvantages, such as the panes rattling as they move, and the bearings are very susceptible to failure because they are exposed to dirt and bad weather. Also, the cost of the product is increased by the need to incorporate bearings on both rails along the entire length of the lower frame profile.

A second solution in which the bearings are placed in the pane, this implies that in order for these bearings to fit and panes to be mounted, there is a wide and deep recess in the lower frame, which can indeed present an inconvenience if the system is recessed, since you can get a foot stuck, it fills with dirt. Further, it has a high weight limitation, as it is usual to use two carriages with a number of bearings per carriage of between two and four, so the maximum weights per pane are usually more limited. The advantages of this solution are that it is cheaper, slides more smoothly and in some cases allows for height adjustment of the pane.

The object of the invention is a system that integrates the two options in the same solution so that both bearings can be mounted to the frame and bearings to the pane, with common elements that achieve that the recess that remains visually and practically the same in any of the two options and with an equally simple mounting in both cases.

DESCRIPTION OF THE INVENTION

The object of the invention is a bearing system for a slide comprising a U-shaped profile with two wings and a web such that between the two wings of the U-shaped profile the system comprises an inner support profile forming a central housing and two lateral housings on the sides of the central housing with two recesses between two of the walls perpendicular to the web and the wings of the U-shaped profile, and a sliding profile comprising two housings facing each other with the lateral housings.

The central housing comprises an element to choose between a central cover that covers it and a rail located in a longitudinal slot of said central housing.

In the bearing system for a slide, which is the object matter of the invention, when the central housing comprises the central cover, each lateral housing comprises a plurality of bearings and in the sliding profile housings two rails are located.

In the bearing system for a slide, which is the object matter of the invention, when the central housing comprises the rail, the system comprises an intermediate piece fixed to the housings of the sliding profile comprising in turn a plurality of bearings located in correspondence with the central housing of the inner support profile.

In the bearing system for a slide, which is the object matter of the invention, the intermediate piece comprises two lateral protrusions configured to fit into two slots of the sliding profile.

In the bearing system for a slide, which is the object matter of the invention, the central cover comprises two protrusions with a flange at the end, the central housing comprises two projections, such that such that the flanges of the central cover are configured to fit into the protrusions of the central housing fixing the central cover in the central housing.

In one embodiment of the bearing system for a slide, which is the object matter of the invention, the web of the U-shaped profile is a double wall with an inner recess.

BRIEF DESCRIPTION OF THE DRAWINGS

The following is a very brief description of a series of drawings which help to better understand the invention and which relate expressly to two embodiments of said invention which are presented as non-limiting examples of the invention.

The numerical references used in the figures are.

Figure 1:
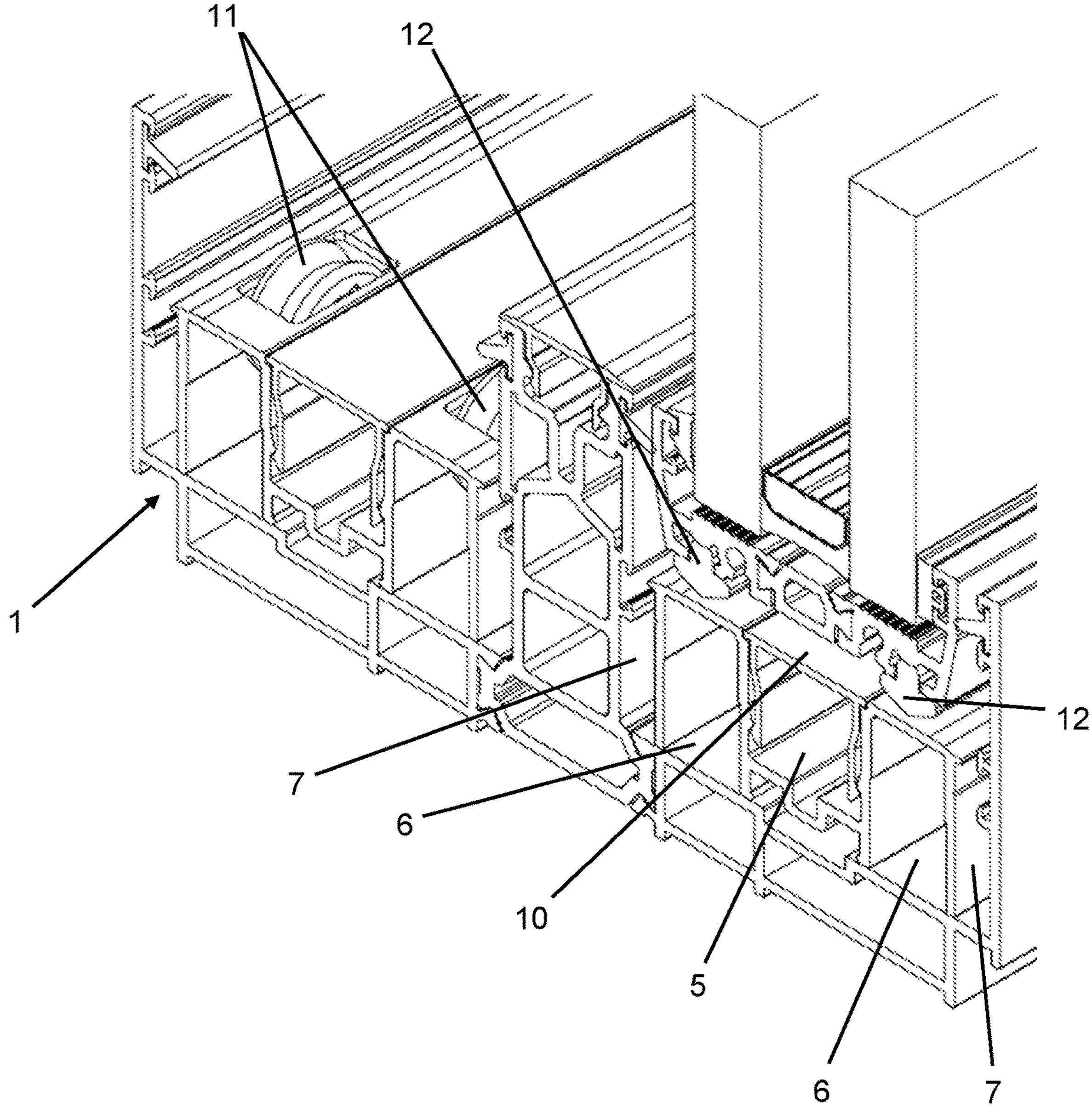
FIG. 1 shows a perspective view of the bearing system for a slide, which is the object matter of the invention, in the embodiment for mounting with bearing in the frame.
Figure 2:
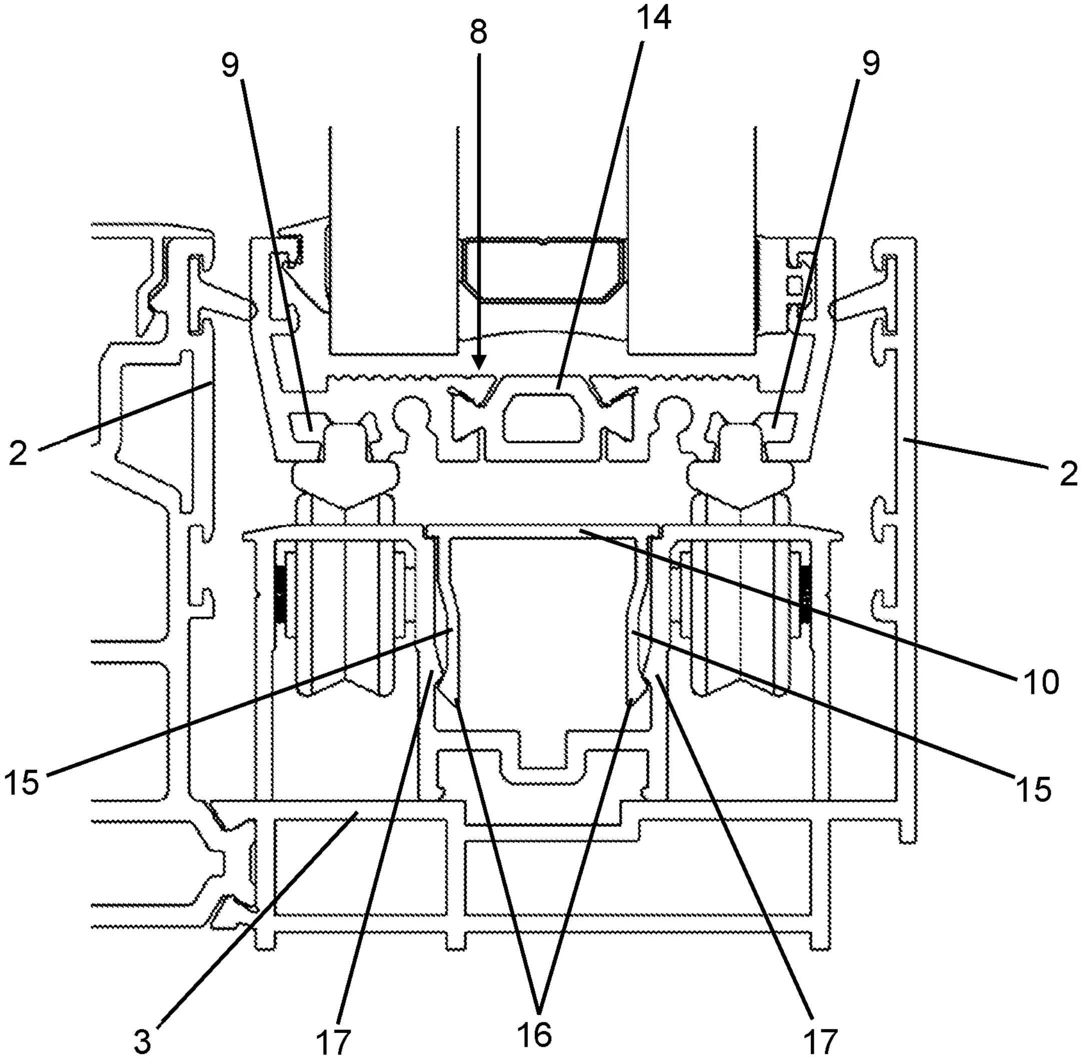
FIG. 2 shows a front view of the bearing system for a slide of the invention of FIG. 1.
Figure 3:
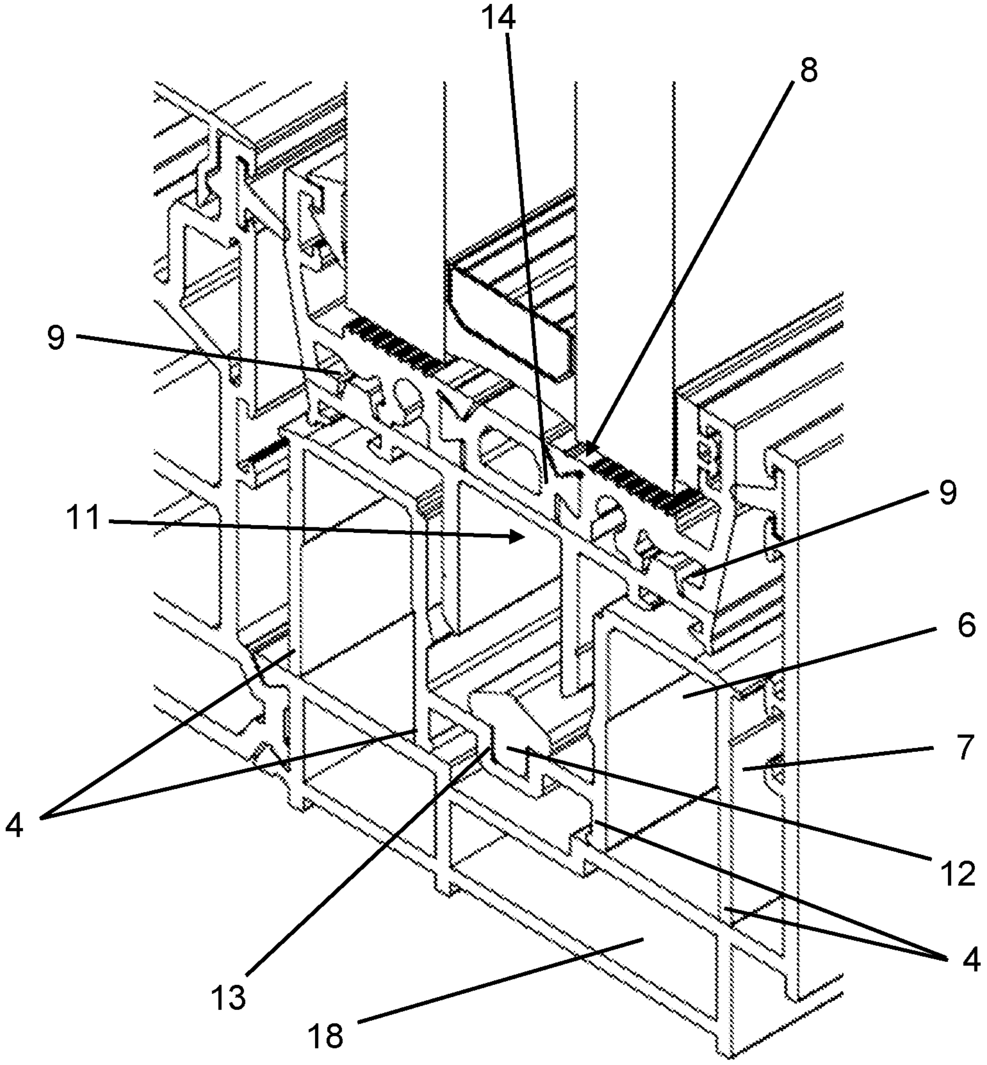
FIG. 3 shows a perspective view of the bearing system for a slide, which is the object matter of the invention, in the embodiment for mounting with bearing in the pane.
Figure 4:
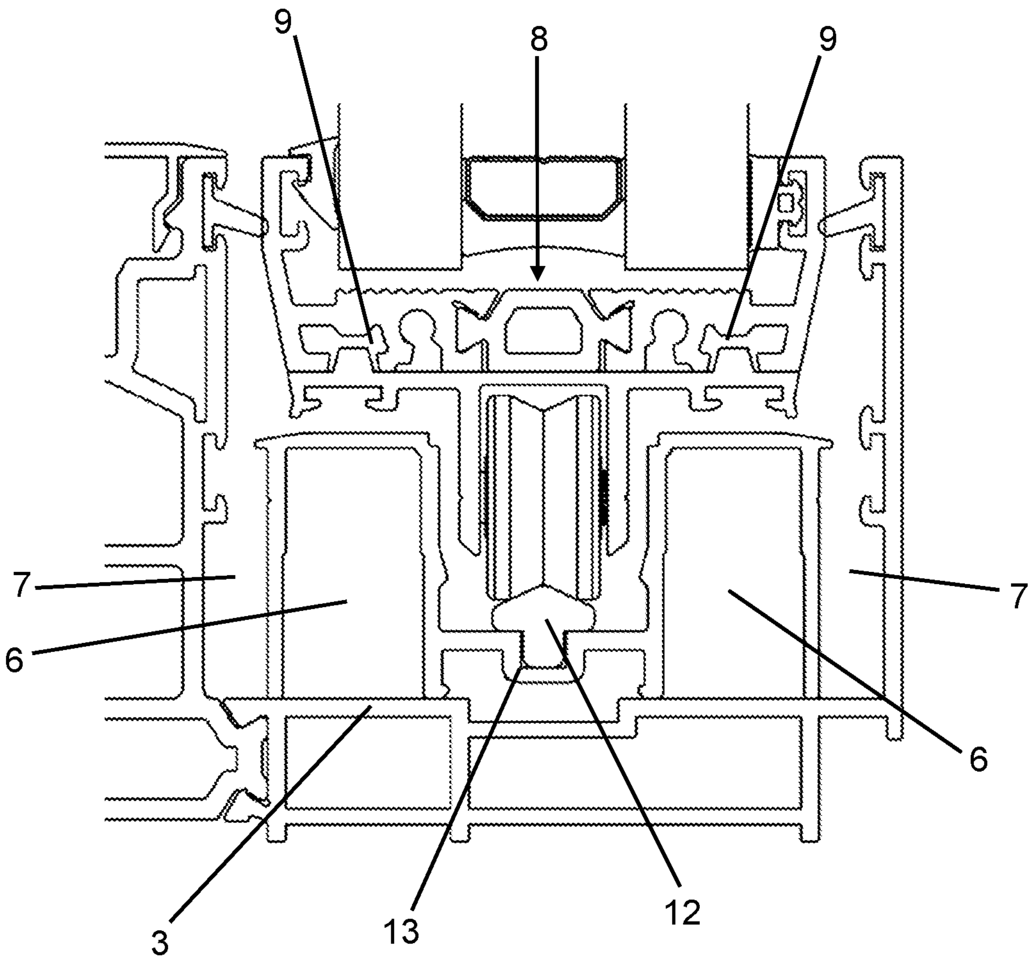
FIG. 4 shows a front view of the bearing system for a slide, which is the object matter of the invention, of FIG. 3.

1. U-shaped profile;
2. wing,
3. web,
4. inner support profile,
5. central housing,
6. lateral housing,
7 recess,
8. sliding profile,
9. sliding profile housings,
10. central cover,
11. bearings,
12. rail,
13. longitudinal slot,
14. intermediate piece,
15. protrusion,
16. flange,
17. projection, and
18. inner recess.

DETAILED DESCRIPTION OF THE INVENTION

The object of the invention is a bearing system for a slide that achieves by means of a common support profile and a series of elements that combine or change to have a bearing system for a slide both for mounting with bearing in the frame and for mounting with bearing in the pane, maintaining both functionally and visually a similar recess in the frame in both configurations.

The bearing system for a slide, which is the object matter of the invention, comprises a U-shaped profile (1) with two wings (2) and a web (3), configured to house within it the other components of the bearing system for a slide, object matter of the invention.

Between the two wings (2) of the U-shaped profile (1) is located an inner support profile (4) that configures a central housing (5) and two lateral housings (6) on the sides of the central housing (5) with two recesses (7) between two of the walls perpendicular to the web (3) and the wings (2) of the U-shaped profile (1). It should be noted that the central housing (5) is somewhat larger than the two lateral housings (6) located at the sides of the central housing (5).

Between the two wings (2) of the U-shaped profile (1), the bearing system for a slide, which is the object matter of the invention, comprises a sliding profile (8), which is the pane profile of the slide, such that the sliding profile (8) comprises two housings (9) which are located opposite to the lateral housings (6) of said U-shaped profile (1).

The web (3) of the bearing system for a slide, which is the object matter of the invention, in the preferred embodiment of the invention, is a double wall with an inner recess (18).

Once the geometry of a part of the bearing system for a slide, which is the object matter of the invention, has been defined, it will now be described which elements are used for the two embodiments.

In the embodiment for mounting with bearing in the frame, the central housing (5) is covered with a central cover (10) while the lateral housings (6) are provided with a plurality of bearings (11).

In this embodiment, the housings (9) of the sliding profile (8), serve to house one rail (12) each, such that the slide is supported on the plurality of bearings (11) through the rails (12).

In the embodiment for mounting with bearing on the pane, a rail (12) located in a longitudinal slot (13) of the aforementioned central housing (5) is located in the central housing (5). The housings (9) of the sliding profile (8) accommodate an intermediate piece (14), which has a plurality of longitudinal bearings (11) located in correspondence with the central housing (5) of the U-shaped profile (1). Therefore, in this embodiment, the system has an intermediate piece (14) that acts as a slider on which the slide pane is supported, since the bearings (11) are supported on the profile located inside the central housing (5) of the inner support profile (4).

For fixing the central cover (10) on the central housing (5) the central cover (10) comprises two protrusions (15) with flanges (16) at the end which are fixed on two projections (17) located inside the central housing (5).

Both the embodiment of the bearing system for mounting with bearing on the frame and for mounting with bearing on the pane described above can be reproduced in parallel so that the system supports more than one pane of the slide.

The invention claimed is:

1. A bearing system for a slide comprising:

a U-shaped profile (1) with two wings (2) and a web (3) located between the two wings (2) of the U-shaped profile (1), an inner support profile (4) that configures a central housing (5) and two lateral housings (6) on sides of the central housing (5) with two recesses (7) between two walls perpendicular to the web (3) and the wings (2) of the U-shaped profile (1);

a sliding profile (8) comprising two sliding profile housings (9) facing the lateral housings (6);

the central housing (5) comprises one of (i) a central cover (10) covering said central housing (5) and (ii) a single rail (12) located in a longitudinal slot (13) of said central housing (5), such that in a first configuration where the central housing (5) comprises the central cover (10) covering said central housing (5), each lateral housing (6) comprises a plurality of bearings (11) and in the housings (9) of the sliding profile (8) two said rails (12) are located; and such that in a second configuration where the central housing comprises the single rail (12) located in said longitudinal slot (13) of said central housing (5), the system comprises an intermediate piece (14) fixed to the housings (9) of the sliding profile (8) comprising in turn the plurality of bearings (11) located in correspondence with the central housing (5) of the inner support profile (4).

2. The system according to claim 1, wherein the intermediate piece (14) comprises two lateral protrusions configured to fit into two slots of the sliding profile (8).

3. The system according to claim 1, wherein:

the central cover (10) comprises two protrusions (15) with a flange (16) at an end of each protrusion, the central housing (5) comprises two projections (17), such that the flanges (16) of the central cover (10) are configured to fit into the projections (17) of the central housing (5) fixing the central cover (10) in the central housing (5).

4. The system according to any one of claims 1 to 3, wherein the web (3) of the U-shaped profile (1) is a double wall with an inner recess (18).

* * * * *